May 28, 1968 B. E. HALL 3,385,050
BEADED CHAIN
Filed March 8, 1966
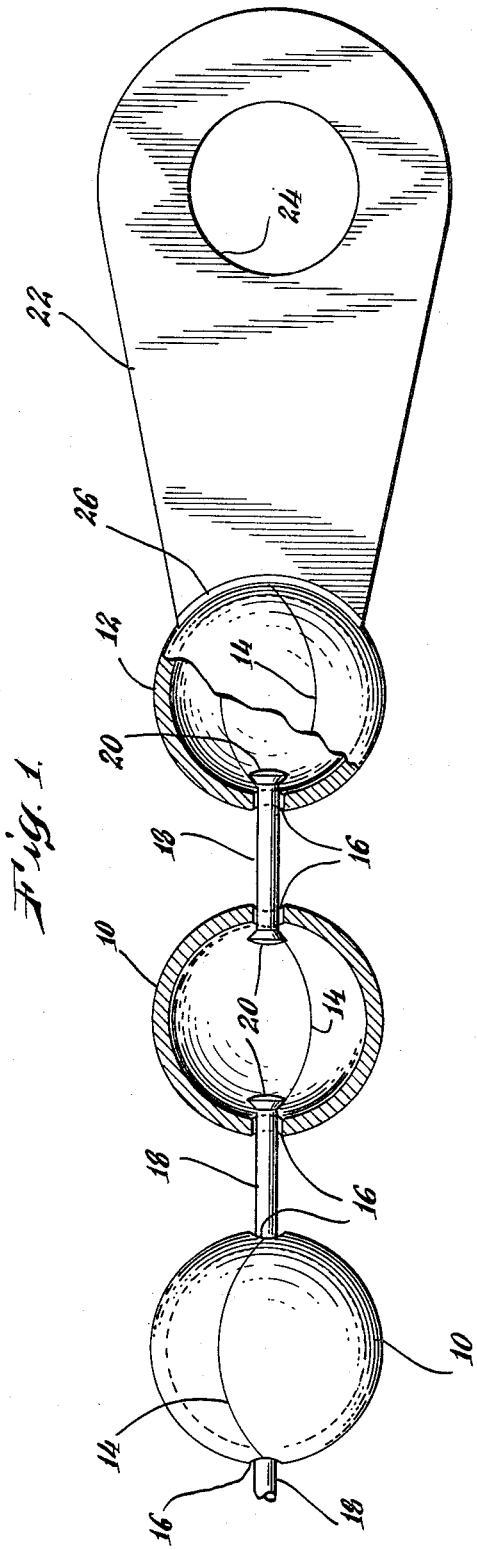
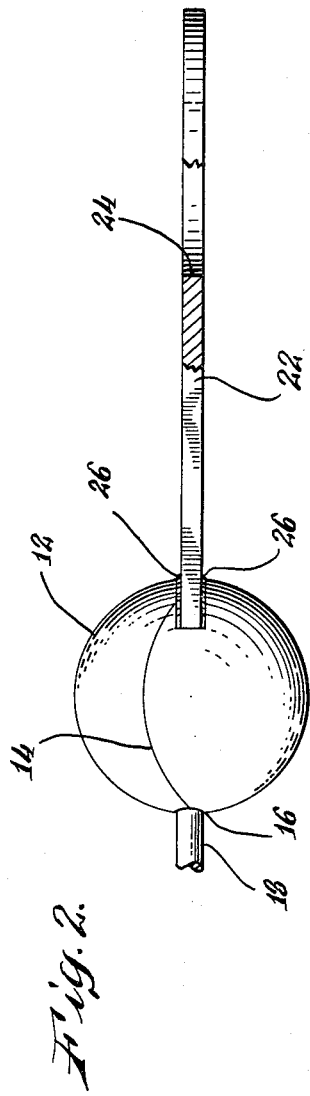
INVENTOR.
Bartley E. Hall
BY
Wooster, Davis & Cipelli
ATTORNEYS.

United States Patent Office 3,385,050
Patented May 28, 1968

3,385,050
BEADED CHAIN
Bartley E. Hall, Newtown, Conn., assignor to Auto-Swage Products, Inc., Shelton, Conn., a corporation of Connecticut
Filed Mar. 8, 1966, Ser. No. 532,753
2 Claims. (Cl. 59—78)

This invention relates to a beaded chain and, more particularly, to such a chain having an improved end loop construction.

Beaded chains are well known and widely used in many applications. As the name implies, a beaded chain is made up of a number of spherically shaped hollow metal beads. Each bead has two diametrically positioned holes and the individual beads are held together by means of wires which extend between adjacent beads, passing through a hole in each of the beads. The ends of the wire are upset to prevent it from being withdrawn from the bead. Each of the beads is formed with a seam which extends between the diametrically arranged holes.

It is often required that a beaded chain be provided with some type of end loop for securing the end of the chain. In the past, end loops have been provided which include a small rod or stem extending therefrom having an upset end similar to that of the interconnecting wires. In placing such a loop at the end of a bead chain, it has been necessary for an operator to open the end bead along its seam by means of a press. The rod end of the loop is then inserted into the bead through the hole and the bead is closed once again. This is a time consuming operation and adds considerably to the cost of manufacturing a beaded chain.

Accordingly it is a primary object of the present invention to provide an improved beaded chain. Other objects are to provide such a chain wherein the end loop may be affixed without opening the end bead. Other objects, features, and advantages will be apparent from the following description, the appended claims and the figures of the attached drawing, wherein:

FIG. 1 is a plan view of a portion of a beaded chain having an end loop in accordance with this invention, portions of the chain being shown in cross-section to illustrate its construction; and FIG. 2 is a front view of the end bead and loop of the chain of FIG. 1.

The objects of the present invention are achieved by means of a beaded chain wherein a ring is welded to the end bead.

With particular reference to the drawing, there is illustrated the end portion of a beaded chain comprising spherical metal beads 10 and an end bead 12. Each of the beads is formed with a semi-circular seam 14 and diametrically positioned holes 16. The beads are formed into a chain by means of wires 18 which extend through the holes 16 of adjacent beads and are upset at their ends 20 so that they cannot be withdrawn from the beads.

The prior art method of attaching an end ring to a beaded chain required a special ring member having a projecting rod or stem similar to the wires 18 which was upset on the end in a fashion similar to the wires. It was then necessary to open bead 12 along seam 14 to insert the upset end of the projection and then compress bead 12 to its original state.

In accordance with the present invention, these operations are dispensed with by providing a planar ring member 22 containing a suitable opening 24 in its main body and having its end curved to match the curvature of bead 12. This ring member is welded directly to end bead 12 by means of a weld 26. This weld can be accomplished quickly and simply by means of hand or machine procedures and eliminates completely the hand operations required to open and close the end bead 12.

It is believed that the many advantages of this invention will now be apparent to those skilled in the art. It will be understood that various modifications may be made in this invention without departing from its spirit and scope. Accordingly, the foregoing description is to be construed as illustrative only rather than limiting. This invention is limited only by the scope of the following claims.

What I claim as new and desire to secure by Letters Patent of the United States is:

1. A beaded chain which comprises: a plurality of hollow metal beads, each having a pair of diametrically positioned holes extending therethrough; a plurality of wires each extending through a hole in each of two adjacent beads, said wire having enlarged end portions larger than said holes to prevent withdrawal from said beads; an end bead having at least one hole therein and secured to said chain by one of said wires; and a ring member integrally welded to said end bead.

2. The chain of claim 1 wherein said ring member is planar and includes a concave portion conforming to the shape of said end bead and welded thereto.

References Cited

UNITED STATES PATENTS

| 61,777    | 2/1867  | Wallace   | 59—78   |
|-----------|---------|-----------|---------|
| 1,662,665 | 3/1928  | Gagnon    | 24—116  |
| 1,664,290 | 3/1928  | Gagnon    | 24—116  |
| 1,685,042 | 9/1928  | Bryant    | 59—93   |
| 1,692,649 | 11/1928 | Goodridge | 24—116  |
| 1,904,479 | 4/1933  | Lashar    | 59—78   |

CHARLES W. LANHAM, *Primary Examiner.*